US006497507B1

(12) United States Patent
Weber

(10) Patent No.: US 6,497,507 B1
(45) Date of Patent: Dec. 24, 2002

(54) HEADLIGHT OR LIGHT

(75) Inventor: Bernhard Weber, Wendeburg (DE)

(73) Assignee: Antje Weber, Wendeburg (DE)

(*) Notice: Subject to any disclaimer, the term of this patent is extended or adjusted under 35 U.S.C. 154(b) by 0 days.

(21) Appl. No.: 09/622,794

(22) PCT Filed: Mar. 20, 1999

(86) PCT No.: PCT/DE99/00791

§ 371 (c)(1), (2), (4) Date: Aug. 23, 2000

(87) PCT Pub. No.: WO99/50594

PCT Pub. Date: Oct. 7, 1999

(30) Foreign Application Priority Data

Mar. 31, 1998 (DE) ........................................ 198 14 300

(51) Int. Cl.$^{7}$ ................................................ B60Q 1/02

(52) U.S. Cl. ....................... 362/547; 362/218; 362/264; 362/345

(58) Field of Search ................................ 362/547, 294, 362/345, 373, 218, 264, 544, 96

(56) References Cited

U.S. PATENT DOCUMENTS 3,229,085 A * 1/1966 Ankrom et al. ............. 362/580
3,573,452 A * 4/1971 Kenyon et al. .......... 240/41.55
3,986,018 A * 10/1976 Ishii ............................ 240/47
4,630,182 A * 12/1986 Moroi et al. ................ 362/294
4,931,912 A * 6/1990 Kawakami et al. ........... 362/61
6,004,010 A * 12/1999 Inange et al. ............... 362/294
6,402,346 B1 * 6/2002 Liao et al. .................. 362/294
6,422,730 B1 * 7/2002 Koren et al. ................ 362/580

FOREIGN PATENT DOCUMENTS

| | | |
|---|---|---|
| DE | 688919 | 3/1940 |
| DE | 31 38 360 | 4/1983 |
| EP | 0 859 188 | 8/1998 |
| FR | 2 701 756 | 8/1994 |
| JP | 6-267305 | * 9/1994 |

OTHER PUBLICATIONS

Munz et al.; "Das Foggingproblem: Meβmethoden, Wege and Erfolge", ATZ Automobiltechnische Zeitschrift 96; 1994; pp. 238–246.

Loock et al.,, "Temperature Dependence of the Fogging Phenomenon"; Kunstoffe German Plastics 83; 1993 pp. 201–205; w/Translation.

* cited by examiner

*Primary Examiner*—Sandra O'Shea
*Assistant Examiner*—Anabel Ton
(74) *Attorney, Agent, or Firm*—Foley & Lardner

(57) ABSTRACT

The invention relates to a headlight or a light (1) for a vehicle, comprising a diffusing panel (2), a casing (5), light sources (3) mounted in the housing (5), reflectors (4) allocated to said light sources and a ventilation system comprising at least one air intake opening (10), an air outlet opening (15) and a blower (7). In order to avoid diminished headlight efficiency in a headlight with fogging plastic parts, the invention provides a blower (7) that is a suction blower suctioning the air from the causing (5). Air guiding devices (30, 31) are mounted inside the causing (5), in such a way that the blower (7) guides the air away from the diffusing panel (2) and directs it pass the hot air pockets towards the back part of the casing opposite to the diffusing panel (2).

20 Claims, 1 Drawing Sheet

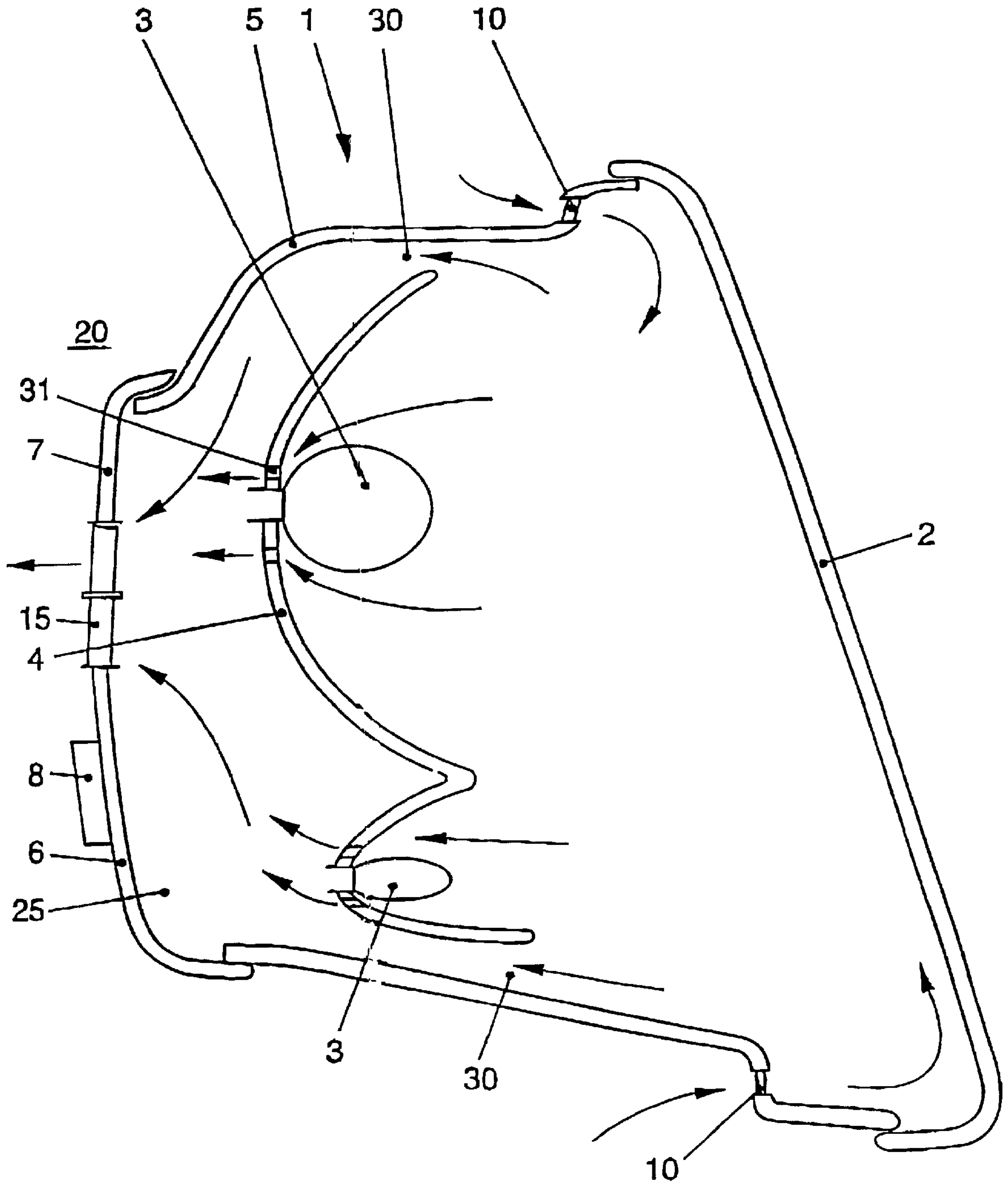
FIG.

HEADLIGHT OR LIGHT

BACKGROUND

The invention relates to a headlight or a light for a motor vehicle, with a diffusion lens, a casing, light sources arranged in the casing, reflectors allocated to said light sources and a ventilation system, which comprises at least one air intake opening, an air outlet opening and a blower.

An embodiment of this kind is disclosed by FR 2 701 756 A1. The blower built into the headlight casing sucks fresh air in via an air intake opening provided in the rear wall of the casing and forces this air along the lower wall of the casing—guided by air guiding devices—against the diffusion lens, along which the air flows in order to flow away to the outside—again guided by air guiding devices—along the upper wall of the casing and through an upper air outlet opening, provided in the region of the rear wall of the casing. The air exchange brought about in this way is intended to remove moist air from the headlight, in order to prevent condensing of the moisture contained in the air on the diffusion lens when the latter or the entire headlight cools down.

In the case of headlights or lights of the new generation, a clear lens is used. The prescribed light distribution is then achieved by deliberate geometrical design of the reflectors. In addition to their actual function, that is of reflecting the light in the direction of light emission, the reflectors can also be used as carriers for light emitting optics for additional lights, such as a flashing turn-signal or fog lights for example. On the engine compartment side, the headlight or light is then enclosed by a casing. By contrast with conventional headlights or lights, here there are, for example, three or even four light sources arranged in one headlight. This simplifies assembly, since, by fitting the headlight, all the lights are already attached to the vehicle. Furthermore, this gives the headlight a technically very interesting impression for a viewer from the outside. By accommodating so many light sources on a relatively small surface area, however, new problems arise with regard to the development of heat. For instance, temperatures of up to 230 degrees are not exceptional in such a headlight. This is of great significance in particular when the vehicle is at a standstill, that is to say there is no longer any cooling by the relative wind. The development of heat may cause, for example, deformations of the diffusion lens or other plastic parts.

In the case of headlights or lights of the new generation, plastics, in particular PC—polycarbonate, UP—unsaturated polyester, PP-GF—glass fiber reinforced polypropylene (ester) and PVC—polyvinyl chloride, are customarily used for the casing or the reflector, or for sealing means. These are fogging plastics, i.e. the plastics contain gassing-out volatile constituents. Constituents which fog out from such plastics are, for example, plasticizers, amines (PU foam catalysts), lubricants, stabilizers, flame retardants or solvents. An exact listing of the fogging constituents is listed in "Das Foggingproblem: Messmethoden, Wege und Erfolge" [the fogging problem: measuring methods, approaches and successes], ATZ Automobiltechnische Zeitschrift 96 (94) pages 238–246 Table 4. The fogging leads to the diffusion lens of the reflectors misting over or turning gray or else to decomposing of the plastic. The fogging increases exponentially with temperature; this is described for example in "Temperaturabhangigkeit des Fogging-Phanomens" [temperature dependence of the fogging phenomenon] Kunststoffe 83 (1993), by F. Loock, Th. Lampe, A. M. Bahadir.

SUMMARY OF THE INVENTION

The invention is based on the object of preventing the risk of the lens or the reflectors in a headlight or a light of the new generation from turning gray or misting over due to fogging.

On the basis of the headlight or light described at the beginning, this object is achieved according to the invention by at least one of the headlight parts consisting at least partially of a fogging plastic, by the blower being a suction blower sucking air away out of the casing, and by air guiding devices being arranged within the casing in such a way that the blower guides the air away from the lens and deliberately past heat pockets to the rear side of the casing, facing away from the lens.

The sucking away of the air has the effect that the components around which the flow passes, that is in particular the reflectors and the casing, are cooled, so that the constituents fogging out from these parts are reduced. The air guidance provided according to the invention also has an effect on the amount of fogging condensate in the headlight. Guiding the air flow past the reflector is particularly important, since the latter requires particular protection against depositing of condensates due to its complicated geometrical design, in order to ensure or maintain unchanged the prescribed light distribution. It is important, furthermore, that the blower guides the air away from the lens, since, if blown air were directed onto the windshield, volatile constituents would be blown onto the lens.

The air flow guided in a way according to the invention causes the fogging plastic parts to be cooled, so that a smaller amount of volatile constituents is released from the plastic parts. The remaining, still volatile constituents are carried away out of the headlight by the increased air exchange. It is important for this purpose that the air flow flowing from the air intake opening to the air outlet opening is increased adequately.

It is expedient if the blower is arranged on or in a cover which releasably closes an opening in the rear side of the casing. In headlights of the generic type, a cover of this kind is generally provided in order to be able to exchange the light sources easily, without having to remove the entire headlight for this purpose. The cover further serves as a fastening attachment for a headlight-range adjusting device or other electrical add-on parts. The arrangement of the blower on or in this cover allows headlights of the new generation to be retrofitted quickly and easily by exchanging the cover for a cover fitted with a blower.

To protect the reflector, it is expedient if the air guiding devices comprise through-flow openings in the reflector, these through-flow openings preferably being arranged close to the light source. In addition, it is advantageous if the air guiding devices comprise gaps between the outer rim of the reflector and the wall of the casing.

The blower is expediently electrically coupled in its function to the parking lights. As a result, when the parking lights are switched on, the blower is activated at the same time, and consequently switched on even when the vehicle is stationary, to be able to compensate for the lack of headlight cooling by the relative wind now absent.

It is further proposed that it should be possible. for the blower to be switched off after a prescribed further running time after the switching off of the headlight or light. As a result, the fully heated-up headlight is still cooled for a time even when the vehicle is stationary, and fogging is prevented.

If the headlight has a plurality of light sources of different light intensity, it is expedient to allocate the blower to the light source of the strongest light intensity, since this emits most heat and consequently represents the most critical point in the headlight. This blower arrangement achieves particularly effective heat dissipation.

The invention is explained in more detail below on the basis of an exemplary embodiment.

BRIEF DESCRIPTION OF THE DRAWING

The single FIGURE shows a headlight with a ventilation system in cross section.

DETAILED DESCRIPTION

The headlight 1 has a casing 5 and a lens 2. The lens may be a diffusion lens. Light sources 3 and reflectors 4 are provided in the casing 5. The light emitted by the light sources 3 is emitted to the outside by the reflectors 4 through the lens 2. The light sources 3 may be fastened, for example, to the reflectors 4 or else to other fastening attachments connected to the casing 5. Furthermore, the reflectors 4 may also be used as carriers for light emitting optics for further light sources which are arranged on the side of the reflector 4 facing away from the lens 2. In modem headlights, a plurality of light sources 3 are in this case arranged on one reflector; the desired light emission distribution is achieved by deliberate geometrical design of the reflectors 4. This makes it possible to use a clear lens 2.

In particular for the case in which a plurality of light sources 3 are switched on simultaneously, the reflectors, the lens 2 and other components in the vicinity of the light sources are heated up particularly strongly. The lens 2 is therefore produced from a specially hardened glass or from specially adjusted plastic, in particular PC-H (polycarbonate), in order to avoid deformations due to the exposure to heat. For production engineering reasons, the casing 5 and/or the reflectors 4 and/or sealing means between the components are produced from plastic. Plastics such as for example PC—polycarbonate, UP—unsaturated polyester, PP-GF—glass fiber reinforced polypropylene (ester) and PVC—polyvinyl chloride have additives such as plasticizing constituents, flame retardants or lubricants, in order to produce the desired properties of the plastics. These volatile constituents are emitted by the plastics as gas, in particular at high temperatures. This process is generally described as fogging. After the headlight has cooled down, these volatile constituents are deposited on the reflectors or the lens and lead to them turning gray. Furthermore, it is possible for fogging to cause the properties of the plastics to change in an unwanted way. The temperature of the plastic has a significant influence on the amount of fogging condensate. For example, a temperature increase from 90° C. to 120° C. leads to the fogging condensate increasing by a factor of ten in the case of an instrument panel membrane.

On the side of the reflectors 4 facing away from the light exit side, the casing 5 has an opening 25. The opening 25 is closed by a cover 6. Removing the cover 6 makes it possible for the light sources 3 to be easily exchanged. Furthermore, the cover 6 serves as a fastening attachment, for example for a control device for a headlight-range adjusting device 8 or plug-in contacts (not shown). Furthermore, the cover 6 has an air outlet opening 15, in which the blower 7 is arranged. The arrangement of the blower 7 in the cover 6 makes it possible for headlights not equipped with a blower also to be retrofitted with a blower. The blower 7 is, for example, a commercially available fan, as used in computer casings.

The volumetric flow is, for example, 11 $m^3/h$ at a current consumption of 0.09 amperes and a voltage of 13 volts; consequently, the power consumed by the fan is very low and is also acceptable from energy-related aspects. The suction removal of the air by the blower 7 has the effect of cooling the components around which the flow passes, such as for example the reflectors 4 or the casing 5, so that the volatile constituents gassing out from these parts are reduced. Furthermore, in addition to the reduction of the fogging-out constituents, the increased air exchange also has an effect on the amount of fogging condensate in the headlight. In addition, air intake openings 10, which are arranged distributed around the circumference of the casing in the region behind the lens 2, may be enlarged for the increased air flow and additional filtering measures (for example carbon filters in conjunction with for example GOROTEX®) with splash water protection may be provided to prevent the ingress of dust, ambient engine vapors and/or water. Furthermore, the invention offers the advantage that the lens 2 is exposed to lower thermal loading on account of the cooling effect and can consequently also be produced from a conventional plastic.

For the rating of the blower 7, it should be taken into consideration that a minimum temperature of approximately 70–80 degrees is reached in the headlight 1. Depending on the size of the air-extraction motor, it is possible to achieve an extracted-air temperature of approximately 30 degrees. This has the advantage that the ambient air sucked in through the air intake openings 10 is heated and is consequently dried at the same time.

The reflectors may have deliberately arranged through-flow openings 31, it then being possible by the choice of the width of gaps 30 and the size of the passage 31 for the air flow to be guided in such a way that it is deliberately taken past heat pockets. Furthermore, it is particularly important for the air flow to be taken past the reflector 4, since, due to its complicated geometrical design, which ultimately determines the light distribution, the reflector 4 has to be especially protected against deposits of condensates, since otherwise the prescribed light distribution is not maintained. The path of the air flow is represented by the arrows. It is particularly important that the blower 7 guides the air away from the lens. In a way similar to the effect which blowing air onto the windshield has on the ventilation in the vehicle interior, blowing air onto the diffusion lens would be undesirable, since this would cause the volatile constituents also to be blown specifically onto the lens 2. Furthermore, the gassing-out volatile constituents may cause the reflector 4 to undergo material decomposition, which ultimately also influences the light distribution.

If one of the light sources 3 is designed as a fog light, it is expedient for the blower 7 to be arranged in the region of the fog light, since the fog light also represents a particularly great heat source on account of its particularly high light output.

The blower 7 is electrically coupled to the parking lights. In this way it is ensured that ventilation of the headlight 1 by means of the blower 7 takes place even when the parking lights are unintentionally activated. Furthermore, it is provided that the blower 7 continues to run for a prescribed further running time after the headlight 1 has been switched off, so that volatile constituents still present are carried away out of the headlight 1, and the headlight is cooled to an acceptable operating temperature, so that further gassing out of volatile constituents is reduced to a minimum.

What is claimed is:

1. A light for a motor vehicle wherein the light includes a fogging plastic, comprising:

a lens, a casing, light sources arranged in the casing, reflectors allocated to said light sources and a ventilation system including at least one air intake opening, an air outlet opening and a blower, wherein the blower is a suction blower sucking air out of the casing, and wherein air guiding devices are arranged within the casing in such a way that the blower guides the air away from the lens past heat pockets to a rear side of the casing, facing away from the lens.

2. A light for a motor vehicle wherein the light includes a fogging plastic, comprising:

a lens, a casing, light sources arranged in the casing, reflectors allocated to said light sources and a ventilation system including at least one air intake opening, an air outlet opening and a blower, wherein the blower is a suction blower sucking air out of the casing, and wherein air guiding devices are arranged within the casing in such a way that the blower guides the air away from the lens past heat pockets to a rear side of the casing, facing away from the lens; and wherein the blower is arranged on a cover which releasably closes an opening in the rear side of the casing.

3. The light according to claim 1, wherein the air guiding devices comprise through-flow openings in the reflector.

4. The light according to claim 3, characterized in that the through-flow openings are arranged close to the light source.

5. The light according to claim 1, characterized in that the air guiding devices comprise gaps between the outer rim of the reflector and the wall of the casing.

6. The light according to claim 1, further comprising a plurality of light sources of different light intensity, the blower being allocated to the light source of the strongest light intensity.

7. A light for a motor vehicle wherein the light includes a fogging plastic, comprising:

a lens, a casing, light sources arranged in the casing, reflectors allocated to said light sources and a ventilation system including at least one air intake opening, an air outlet opening and a blower, wherein the blower is a suction blower sucking air out of the casing, and wherein air guiding devices are arranged within the casing in such a way that the blower guides the air away from the lens past heat pockets to a rear side of the casing, facing away from the lens; and wherein the blower is electrically coupled to parking lights.

8. The light according to claim 1, wherein the blower can be switched off after a prescribed further running time after the switching off of the light.

9. The light according to claim 1, wherein the plastic is a PC—polycarbonate, UP—unsaturated polyester, PP-GF—glass fiber reinforced polypropylene (ester) and PVC—polyvinyl chloride.

10. The light according to claim 1, wherein the air intake openings are arranged on the circumference of the casing in the region behind the lens.

11. The light according to claim 1, wherein the lens is positioned to cover an opening in the casing.

12. The light according to claim 2, wherein the air guiding devices comprise through-flow openings in the reflector.

13. The light according to claim 12, characterized in that the through-flow openings are arranged close to the light source.

14. The light according to claim 2, characterized in that the air guiding devices comprise gaps between the outer rim of the reflector and the wall of the casing.

15. The light according to claim 2, further comprising a plurality of light sources of different light intensity, the blower being allocated to the light source of the strongest light intensity.

16. The light according to claim 2, wherein the blower can be switched off after a prescribed further running time after the switching off of the light.

17. The light according to claim 2, wherein the blower is electrically coupled to parking lights.

18. The light according to claim 2, wherein the air intake openings are arranged on the circumference of the casing in the region behind the lens.

19. The light according to claim 2, wherein the lens is positioned to cover an opening in the casing.

20. The light according to claim 1, wherein the air guiding devices are arranged to guide the air flow past a reflective surface of the reflector.

* * * * *